UNITED STATES PATENT OFFICE.

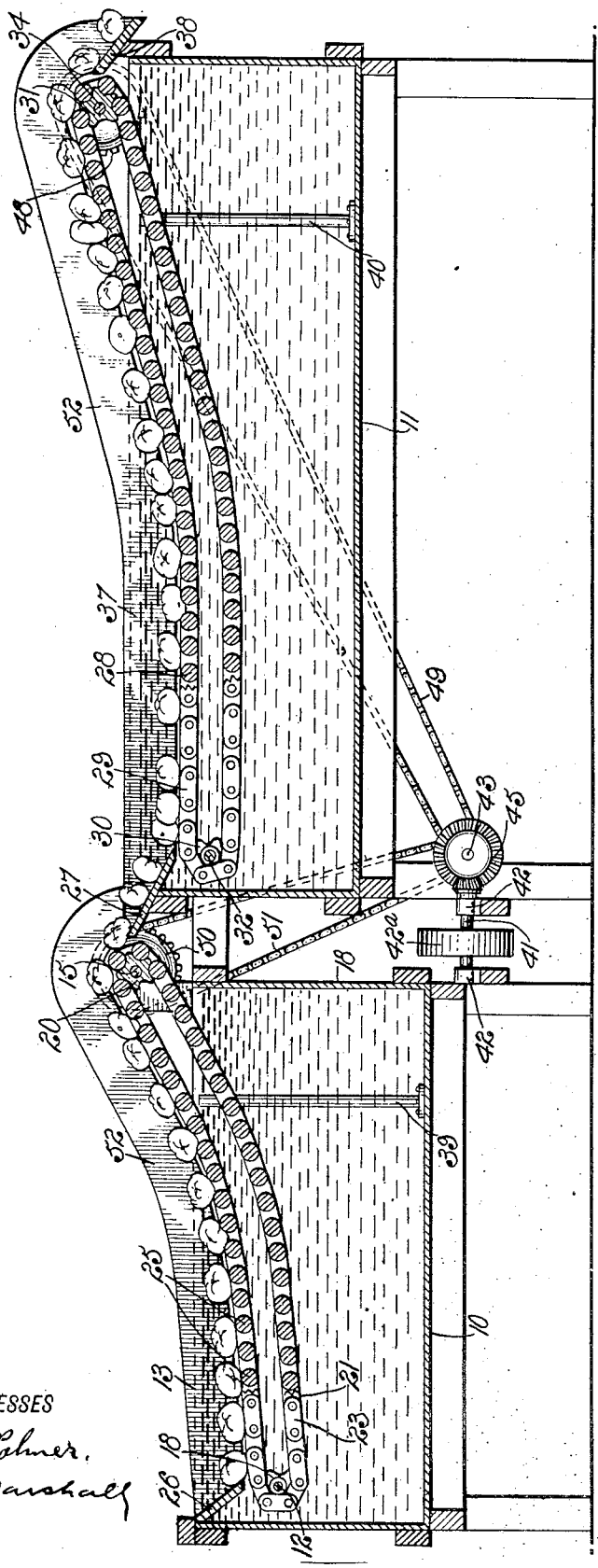

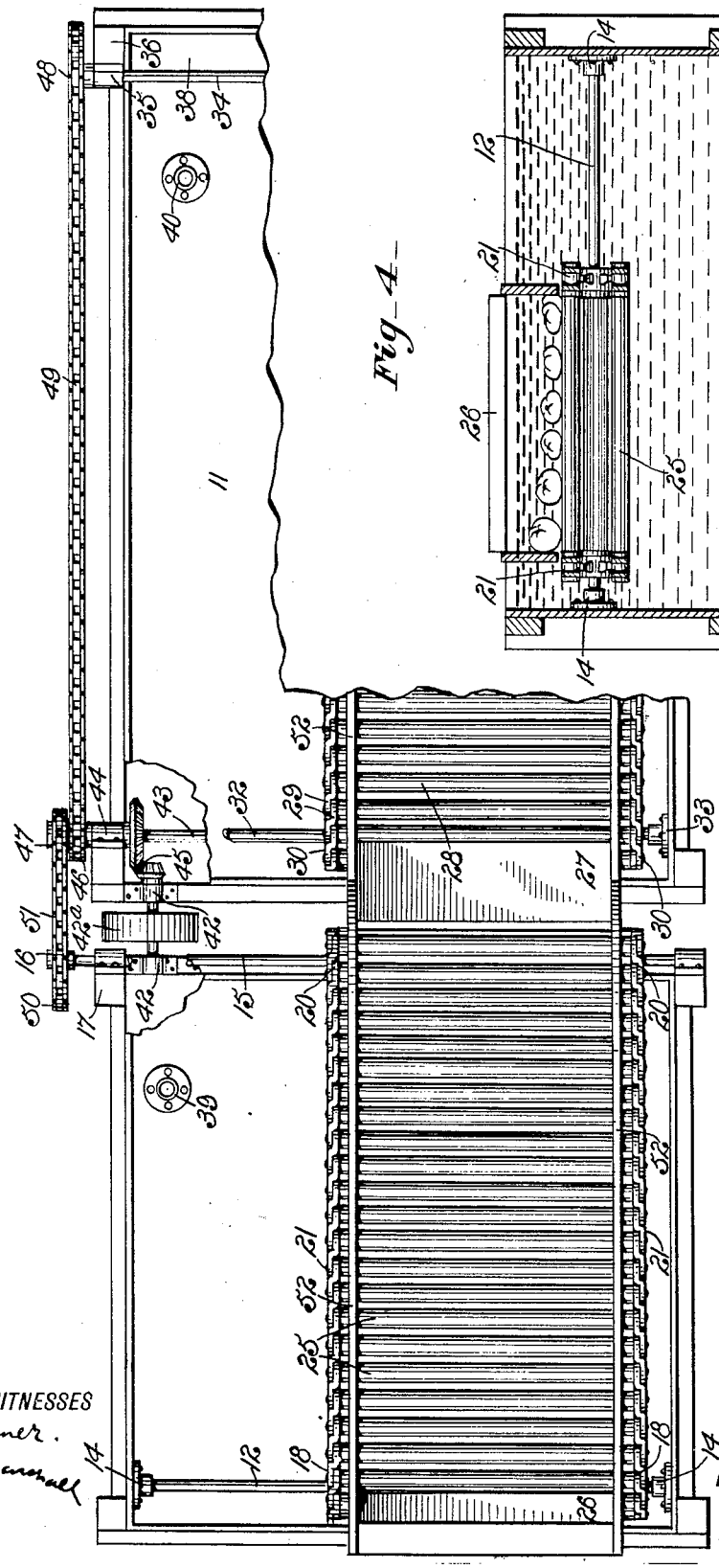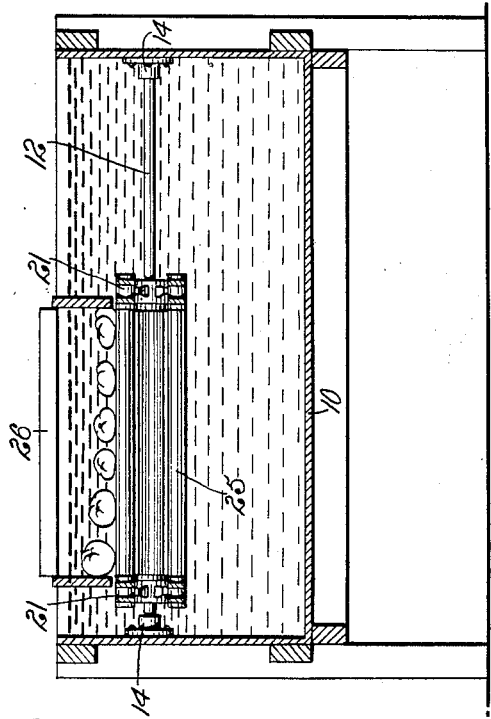

THOMAS JEFFERSON PETERS, OF PETERS, FLORIDA.

APPARATUS FOR PREPARING FRUIT FOR SHIPMENT.

1,245,380.     Specification of Letters Patent.     Patented Nov. 6, 1917.

Application filed July 14, 1916. Serial No. 109,408.

*To all whom it may concern:*

Be it known that I, THOMAS J. PETERS, a citizen of the United States, and a resident of Peters, in the county of Dade and State of Florida, have invented a new and Improved Apparatus for Preparing Fruit for Shipment, of which the following is a full, clear, and exact description.

My invention has for its object to provide an apparatus for treatment to retard or hasten the ripening of tomatoes and other fruit, so that the tomatoes or fruit of the same maturity may be shipped for a short or long distance, to near or distant points, and arrive at each of the said points at substantially the same stage of maturity.

Another object of the invention is to wash the tomatoes or fruit, and treat them to destroy bacteria or fungus thereon, thereby preventing any rot or decay during shipment.

Additional objects of the invention will appear in the following specification, in which the preferred form of the invention is disclosed.

In the drawings similar reference characters denote similar parts in all the views, in which—

Figure 1 is a longitudinal sectional view of the apparatus used in carrying out my process;

Fig. 2 is an enlarged fragmentary view partially in section showing the manner of constructing the conveyer means;

Fig. 3 is a fragmentary plan view; and

Fig. 4 is a transverse sectional view of one of the tanks.

While my apparatus is especially well adapted to be used in the treatment of tomatoes, it will, of course, be understood that the apparatus may be used in treating other vegetables and fruit.

In the shipment of tomatoes, there has been great difficulty in the past in making the shipments in a manner which will assure the arrival of the tomatoes or fruit at the market matured to a point where the best price may be obtained. It will be understood that it is necessary to pick the tomatoes green for shipment, and that, not only is it impossible always to obtain the tomatoes at the same stage of maturity, but that the matter of the distance to the different markets introduces another factor which must receive the careful attention of the grower and shipper. While the tomatoes at a given stage of maturity may be shipped with safety to one market, to obtain the maximum price, the same fruit if shipped to another market which is a shorter or longer distance away, may be green or overripe on arrival, which would, of course, make it impossible to sell the tomatoes at the highest price. While it has been necessary for all growers and shippers in the past to contend with these difficulties, they are removed by the use of my method and apparatus, which is set forth in detail in the specification, and in addition, my method includes treating the tomatoes to free them from disease when they are shipped, so that there will be no danger of rot or decay during shipment. To accomplish this, my method includes means to destroy bacteria, fungus, and other diseases which would otherwise develop in the fruit during the shipping period.

By referring to the drawings, it will be seen that in carrying out my method, I make use of two tanks 10 and 11, a shaft 12 being disposed transversely in the tank 10, below the normal fluid level 13, the shaft 12 being journaled in bearings 14 at the sides of the tank. Another shaft 15 is journaled in bearings 16 in brackets 17 disposed above the end 18 of the tank. To each of these shafts 12 and 15 there is secured a set of sprocket wheels, one set of sprocket wheels 19 being mounted on the shaft 12 for rotating therewith, and the other set of sprocket wheels 20 being mounted on the shaft 15 for rotating therewith. Two companion sprocket chains 21 are provided, which are disposed around the sprocket wheels 19 and 20, thereby connecting the shafts 12 and 15. Pins 22 connect the links 23 of the sprocket chains 21, extending inwardly beyond the links 23 and being provided with bearings 24 in which transversely disposed rollers 25 are disposed. These rollers, together with the sprocket chains 21 serve as a conveyer means for moving the tomatoes through and out of the tank 10.

It will be seen by referring to Fig. 3 of the drawings, that there is a considerable space in the tank at one side of the said conveyer means, this space being provided so that when desired ice may be placed under the conveyer means, which will lower considerably the temperature of a washing fluid contained in the tank 10. The object in subjecting the tomatoes to an ice water bath is to retard the development of the fruit so that the maturity of the fruit will be considerably delayed, which treatment would be advisable if the tomatoes were to be shipped for a period of, say, six days, while the tomatoes would mature during the shipment in the ordinary course in three days. It will, therefore, be seen that by the use of my method the tomatoes of a certain maturity may be shipped to a predetermined market, and obtain the maximum price, which is now impossible by the methods of packing and shipment which are being followed by tomato growers and shippers. In some cases tomatoes are at such a stage of maturity that, if they were shipped for a certain period they would in the usual course arrive green, and this would prevent the shipper from obtaining the maximum price, for it would be necessary in such a case either to sell the tomatoes for consumption in this unripe state, or to hold them under proper conditions for ripening. In either case the cost to the consignee would be considerable, and this would naturally lessen the market value of the fruit on arrival. In such a case, where the tomatoes are unripe when the period of shipment is started, instead of using ice water in the tank 10, I fill the tank 10 with warm water, the temperature of which and the period during which the tomatoes are to remain in the said warm water being determined by the maturity of the fruit and the necessary shipping period.

The tomatoes are deposited in the tank 10 at a chute 26, the weight of the tomatoes serving to press the fruit beneath against the rollers 25, and with the rotation of the shaft 15 the rollers 25 serve to move the tomatoes through the washing bath in the tank 10, either cold or warm as occasion may require, and out of the tank 10 at the shaft 15, where the tomatoes are fed to a chute 27 which directs them into the tank 11.

In this tank 11, I make use of a fluid containing disease-destroying properties, which will kill fungus, bacteria, or other germs and matter which would, in the ordinary course, develop decay and rot in the tomatoes during their shipment. A solution of any desired fungicide may be used in this tank 11, having in mind the particular conditions at hand. In many cases a solution of Bordeaux mixture has been found to satisfy the requirements.

The tomatoes are deposited by the chute 27 on rollers 28 which are similar to the rollers 25, and which are mounted on links 29 of two sprocket chains which correspond with the sprocket chains 21, which have been described. These sprocket chains are disposed around sprocket wheels 30 and 31, the sprocket wheels 30 being secured to a shaft 32 journaled in bearings 33 at the sides of the tank 11, and the sprocket wheels 31 being secured to a shaft 34 journaled in bearings 35 on brackets 36 extending from the sides of the tank 11. The shaft 32 and the sprocket wheels 30 are disposed below the normal level 37 of the fluid in the tank 11, so that the tomatoes as they slide down the chute 27 will press each other below the level 37 in the tank 11, and against the rollers 28, the rotation of the shaft 34 serving to move the sprocket chains and the rollers 28 to convey the tomatoes through the fluid in the tank 11 and up out of the fluid, inasmuch as the shaft 34 and the sprocket wheels 31 are disposed above the level of the fluid. The tomatoes pass from the rollers 28 to a delivery chute 38. The tomatoes, after having passed from the delivery chute, are dried in any approved manner.

There is an overflow pipe 39 in the tank 10, and there is an overflow pipe 40 in the tank 11, these overflow pipes 39 and 40 being provided for a purpose readily understood.

The two conveyer means, one in each tank, which have been described, are driven by the following means: A shaft 41 is journaled in bearings 42, and a driving pulley 42$^a$ is mounted on the said shaft 41. A shaft 43 is journaled in bearings 44 in the frame of the tank 11, and this shaft 43 is driven by the shaft 41, by means of bevel gears 45. There is secured to the shaft 43, two sprocket wheels 46 and 47, the sprocket wheel 46 being connected with a sprocket wheel 48 on the shaft 34 by means of a sprocket chain 49, and the sprocket wheel 47 being connected with a sprocket wheel 50 on the shaft 15 by means of a sprocket chain 51.

Guides 52 extend from the chute 26 to the delivery chute 38, these guides being disposed adjacent the upper portions of the rollers 25 and 28, and at the sides of the chute 27, thereby preventing the lateral displacement of the tomatoes during their passage through the apparatus.

Having thus described my invention, I claim as new and desire to secure by Letters Patent:

1. In an apparatus for preparing fruit for shipment, a tank containing a fluid, a rotatably mounted wheel disposed in the tank below the fluid, a second wheel rotatably mounted on a horizontal axis, disposed above the level of the axis of the first wheel, and a belt having upwardly disposed members spaced apart for supporting fruit, the belt being disposed around the wheels for moving the fruit through the fluid to a point where it may be automatically discharged.

2. In an apparatus for preparing fruit for shipment, two tanks one containing a washing fluid and the other a disease-destroying fluid, means to move fruit out of one tank and into the other tank, and means to move the fruit through the last mentioned tank.

3. In an apparatus for preparing fruit for shipment, a tank containing a washing fluid, a second tank containing a disease-destroying fluid, means for directing fruit from the top of the first tank to the second tank, conveying means for moving fruit from the first tank to the first means, and conveying means for moving the fruit out of the second tank.

4. In an apparatus for preparing fruit for shipment, a tank containing a washing fluid, a second tank containing a disease-destroying fluid, means for directing fruit from the top of the first tank to the second tank, a rotatably mounted wheel at the first tank adjacent the said means, another rotatably mounted wheel in the first tank spaced from the first wheel and disposed in the fluid, conveyer means disposed around the wheels, a rotatably mounted wheel in the second tank, a second rotatably mounted wheel at the second tank and disposed above the first wheel in the second tank, and conveyer means disposed around the last two mentioned wheels.

5. In an apparatus for preparing fruit for shipment, a tank containing a washing fluid, a second tank containing a disease-destroying fluid, means for directing fruit from the top of the first tank to the second tank, a rotatably mounted wheel at the first tank adjacent the said means, another rotatably mounted wheel in the first tank spaced from the first wheel and disposed in the fluid, conveyer means disposed around the wheels, a rotatably mounted wheel in the second tank, a second rotatably mounted wheel at the second tank and disposed above the first wheel in the second tank, conveyer means disposed around the last two mentioned wheels, and means for simultaneously rotating a wheel in each tank.

6. In an apparatus for preparing fruit for shipment, a tank, a second tank, means for directing fruit from the top of the first tank to the second tank, conveyer means for moving fruit from the first tank to the first means, and conveying means for moving the fruit out of the second tank.

7. In an apparatus for preparing fruit for shipment, a tank, a rotatably mounted wheel disposed on a transverse axis in the tank, a second rotatably mounted wheel spaced from the first wheel and disposed on a transverse axis at the tank and above the horizontal plane of the first wheel, and conveyer means disposed around the roller and spaced from the side of the tank to permit of the introduction of a cake of ice under the conveyer means.

8. In an apparatus for preparing fruit for shipment, a tank containing a washing fluid, a second tank containing a disease-destroying fluid, means for directing fruit from the top of the first tank to the second tank, a conveyer belt for moving fruit from the first tank to the said means, and a second conveyer belt for moving the fruit out of the second tank.

9. In an apparatus for preparing fruit for shipment, a tank and a conveyer, means for moving fruit through and out of the tank, the conveyer means being spaced from one side of the tank to permit of the introduction of a cake of ice under the conveyer means.

THOMAS JEFFERSON PETERS.